No. 767,628. PATENTED AUG. 16, 1904.
J. W. H. CHRISMAN.
ANTICONTRACTION STEEL BAR HOOF PAD.
APPLICATION FILED AUG. 29, 1903.
NO MODEL.

Witnesses

Inventor
Joseph W. H. Chrisman
By J. A. Rosen
Atty

No. 767,628. Patented August 16, 1904.

UNITED STATES PATENT OFFICE.

JOSEPH W. H. CHRISMAN, OF TOPEKA, KANSAS, ASSIGNOR OF ONE-FOURTH TO EUGENE P. POLLARD, OF TOPEKA, KANSAS.

ANTICONTRACTION STEEL-BAR HOOF-PAD.

SPECIFICATION forming part of Letters Patent No. 767,628, dated August 16, 1904.

Application filed August 29, 1903. Serial No. 171,178. (No model.)

*To all whom it may concern:*

Be it known that I, JOSEPH W. H. CHRISMAN, a citizen of the United States of America, residing at Topeka, in the county of Shawnee and State of Kansas, have invented new and useful Improvements in Anticontraction Steel-Bar Hoof-Pads for Horseshoes, of which the following is a specification.

The nature of the invention is indicated by the title; and the objects are to provide a horseshoe with a detachable steel bar, to provide a shoe which tends to spread the hoof instead of contracting it as it grows, to provide a cushion for the pad which may be readily replaced when the cushion is worn out, and to combine these various elements in a form which may be constructed with the greatest strength and economy and so that they may be readily fitted to the hoof and one or any number of the parts easily and quickly replaced.

The invention is illustrated in the accompanying drawings, forming part of this specification, and in which—

Figure 1:
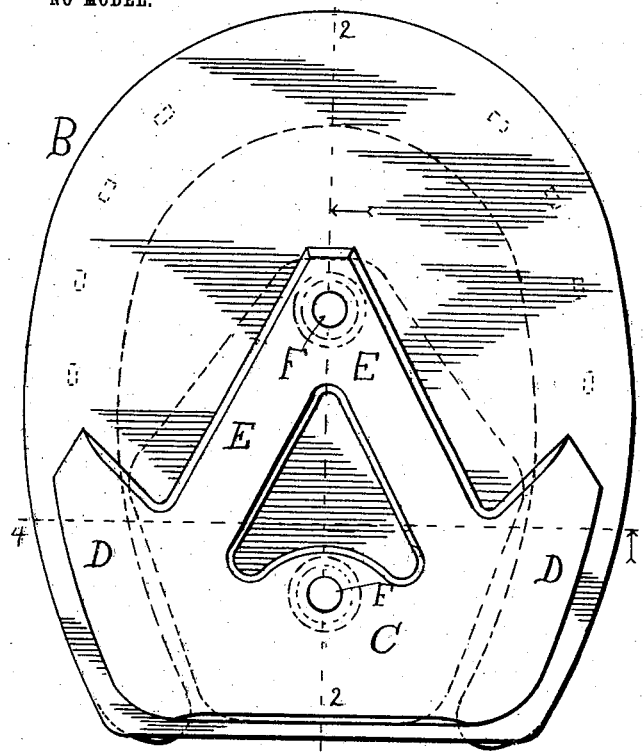
Figure 2:
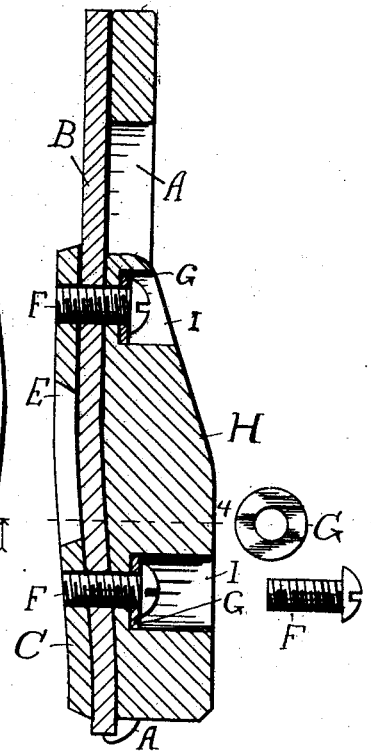
Figure 3:
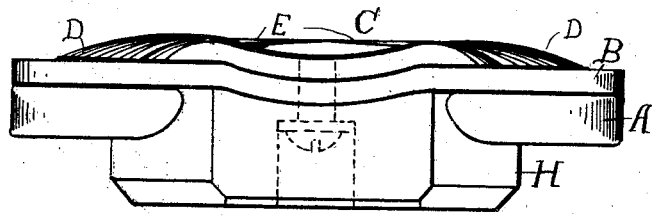
Figure 4:
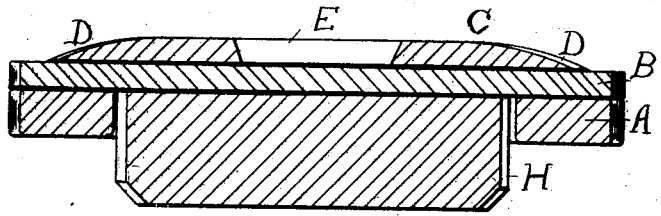
Figure 5:
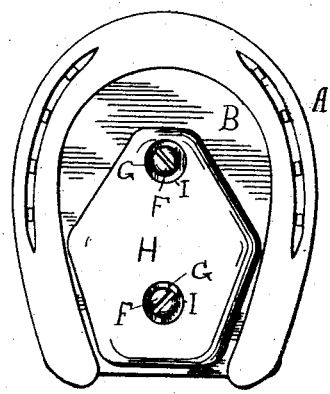

Figure 1 is a top or plan view of the pad applied to the shoe, the cushion and the shoe being shown in dotted outlines. Fig. 2 is a longitudinal central section through the line 2 2, Fig. 1, showing also separate views of the screw and washer by which the three parts—the bar, the pad, and the cushion—are secured together. Fig. 3 is a rear view. Fig. 4 is a cross-section taken through the line 4 4, Figs. 1 and 2. Fig. 5 is a reduced bottom view.

Like letters of reference indicate like parts throughout the several views.

A represents any suitable horseshoe.

B is the pad of any suitable size, shape, or material and corresponds to and may be the leather pad commonly used between the shoe and the hoof, being of a size and shape to conform to the outline of the hoof and shoe.

C is the steel bar adapted to extend from heel to heel of the shoe, and which, however, may be of any suitable material, but preferably of wrought iron or steel. At present the bar-shoe is usually made by welding the bent long ends of the heels together, thereby making a single-piece shoe; but in this invention the bar is not directly secured or welded to the shoe, but is attached to the pad by the screws F F, and the pad, being nailed in between the hoof and the shoe, serves to secure and retain the bar in its proper position. Preferably the bar has a couple of forwardly-projecting braces E E in order that the cushion may be securely attached to the pad, as will be seen from an inspection of the drawings. It must be understood, however, that this shape may be varied to suit any need or fancy. The outer edges D D of the bar are inclined outwardly and downwardly, being chamfered down so as to incline toward the outer edge of the shoe, as more clearly illustrated in Figs. 3 and 4. The object of this feature is that the growing hoof will expand instead of being contracted, as is the case with the shoes now commonly used.

The bar is of sufficient length or width, it will be noted, to span or bridge the heels of the shoe, so that the pressure of the frog upon the bar will be supported by the heels of the shoe. By this means the pressure of the rear portion of the foot is on the frog instead of on the heels of the foot, but the pressure is supported on the heels of the shoe, and as the pad is interposed between the bar and the shoe this serves to take up the jar resulting from striking the hard road or pavement, even though no cushion be used.

The pad and bar just described may be used without a cushion, in which case the screws F F should be somewhat shorter and the washers G G should engage the under side of the pad to prevent the screw-heads from pulling through the leather; but if it is desirable to use a cushion then it is preferred to use one of the shape shown, although any other shape may be used, as I do not intend to limit myself to the use of this or any particular shape of cushion. The cushion H is secured to the pad by means of the screws F F, the washers G G serving to prevent the cushion, which is made of rubber or any other suitable material, from tearing loose, the screw-heads and washers being countersunk in the cushion, as shown at I I, Fig. 2, so as not to come in contact with the pavement.

The bars C may be molded or stamped in the various sizes corresponding to the sizes of the shoes and may be thereafter nicely fitted to each particular hoof, together with the shoe and pad. The bar may be easily handled and shaped by the horseshoer to meet any requirement—as, for instance, it may be arched at the middle instead of being depressed in order to relieve very tender heels from pressure, and, indeed, it may conveniently and readily be shaped so as to be adjustable to any shape of hoof and to meet any requirement of any hoof.

To apply the invention, the bar C, being shaped to the hoof, may be secured to the pad B by the screws F F. If it is desired to use the cushion, the three parts are secured together, as shown, the chamfered side of the bar being next the hoof-surface, and the shoe is then nailed to the hoof, the nails being driven through the pad in the usual manner, whereby the pad, the bar, and the cushion, as well as the shoe, are properly secured in place. When the cushion wears out, which it will frequently when rubber is used, it may be replaced by a new cushion by the screws F F without removing the shoe, and the old shoe may be replaced by a new one, while the same bar may be used again.

By the term "bar" in this specification is meant the bar connecting the heels of the shoe, such bar being usually to relieve the pressure on the heels and to transfer it to the frog, although it is seen that the present bar is adapted to serve purposes also which the ordinary bar is not capable of.

What I claim as new, and desire to secure by Letters Patent, is—

1. The combination of the horseshoe and the separate bar therefor having its outer edges chamfered to incline downwardly and outwardly toward the outer edge of the shoe.

2. The combination of the horseshoe and the bar above and connecting the heels of the shoe and having its outer edges chamfered outwardly and downwardly toward the outer edges of the shoe.

3. The anticontraction bar hoof-pad for horseshoes, comprising the combination of the pad and the bar having outer edges chamfered to incline downwardly and outwardly.

4. The anticontraction bar hoof-pad for horseshoes, consisting of the combination of the pad and the bar detachably secured thereto and having its outer edges chamfered to incline downwardly and outwardly toward the outer edges of the shoe.

5. The combination of the pad, the bar having its outer edges chamfered to incline downwardly and outwardly toward the outer edges of the shoe, the cushion, and the screws for detachably securing said three elements together.

6. The combination of the pad, the bar separate from the shoe and detachably secured to the pad and having its outer edges chamfered to incline downwardly and outwardly toward the outer edges of the shoe, the cushion, and the screws for detachably securing said three elements together.

7. The separate frog-supporting bar for horseshoes having its outer edges chamfered to incline outwardly and downwardly toward the outer edges of the shoe.

8. The combination of the pad and the separate frog-supporting bar secured thereto, said bar being adapted to span the heels of the shoe, so that the pressure of the frog upon the bar will be supported by the heels of the shoe.

9. The combination of the shoe, the frog-supporting bar, and the pad, the bar being secured to the pad and resting on the heels of the shoe with the pad between the bar and the shoe.

10. The combination of the pad, the frog-supporting bar separate from the shoe and secured to the pad, and the cushion; with means operative from the lower side for detachably securing the cushion to said pad and plate, whereby the cushion may be attached and detached at will while the shoe remains on the hoof.

11. The combination of the pad, the frog-supporting bar separate from the shoe and secured to the upper side of the pad and adapted to span the heels of the shoe, and the cushion; together with the means operative from the under side whereby the cushion may be attached and detached at will without removing the shoe, pad, or bar from the hoof.

In testimony whereof I have hereunto set my hand in the presence of witnesses.

JOS. W. H. CHRISMAN.

Witnesses:
P. C. MOORE,
W. S. ANDERSON.